Dec. 13, 1949     E. H. CARRUTHERS     2,490,945
APPARATUS FOR WEIGHING AND SORTING ARTICLES
Filed Oct. 2, 1944     2 Sheets-Sheet 1

INVENTOR.
EBEN HUNTER CARRUTHERS
BY

Dec. 13, 1949  E. H. CARRUTHERS  2,490,945
APPARATUS FOR WEIGHING AND SORTING ARTICLES
Filed Oct. 2, 1944  2 Sheets-Sheet 2

INVENTOR.
EBEN HUNTER CARRUTHERS
BY

Patented Dec. 13, 1949

2,490,945

UNITED STATES PATENT OFFICE 2,490,945

APPARATUS FOR WEIGHING AND SORTING ARTICLES

Eben H. Carruthers, Warrenton, Oreg.

Application October 2, 1944, Serial No. 556,803

11 Claims. (Cl. 209—121)

1

My invention relates to apparatus for packing products of variable weight. Reference is made to my copending applications, Serial No. 398,460, filed June 17, 1941, now abandoned and Serial No. 444,510, Patent No. 2,470,916 filed May 26, 1942, both entitled Method and apparatus for selectively packing products of variable weight.

In the above mentioned applications I have shown and described a method and machine particularly adapted for although by no means limited to the packing of tuna. In the machines of the above inventions, the tuna after being quartered are cut into pieces, weighed and sorted into separate groups or compartments. A plurality of pieces of tuna are then selected automatically which have a predetermined combined weight with which a can is to be filled. The pieces are then packed in a can or other suitable container.

The present invention relates to improvements in the weighing mechanism and is suitable for use in a machine of the general type shown in the above mentioned copending applications. While the mechanism of the present invention will be described in connection with the packing of tuna, it will be understood that the invention has broader application and may be used generally.

An object of my invention is to provide an improved weighing and sorting mechanism.

Another object of my invention is to provide a sensitive and accurate weighing mechanism, in combination with a sorting mechanism, capable of performing the weighing operation and sorting the articles while the articles being weighed are in motion.

A further object of my invention is to provide a weighing mechanism which is rapid in action whereby the articles being weighed may be maintained in continuous motion and so that when an article passes over the scale or weighing arm the operation of the rapid or snap action weighing mechanism is capable of actuating mechanism for displacing the article being weighed off the scale or weighing arm at the proper time.

My invention further contemplates the provision of means for continuously conveying articles while they are being weighed, the system including a coordinated series of weighing devices provided with means for accurately adjusting the weighing devices either individually or all of them simultaneously.

Other objects and advantages of my invention will be pointed out in the claims and will be apparent from the following description, when taken in connection with the accompanying drawings, in which:

2

Figure 2:
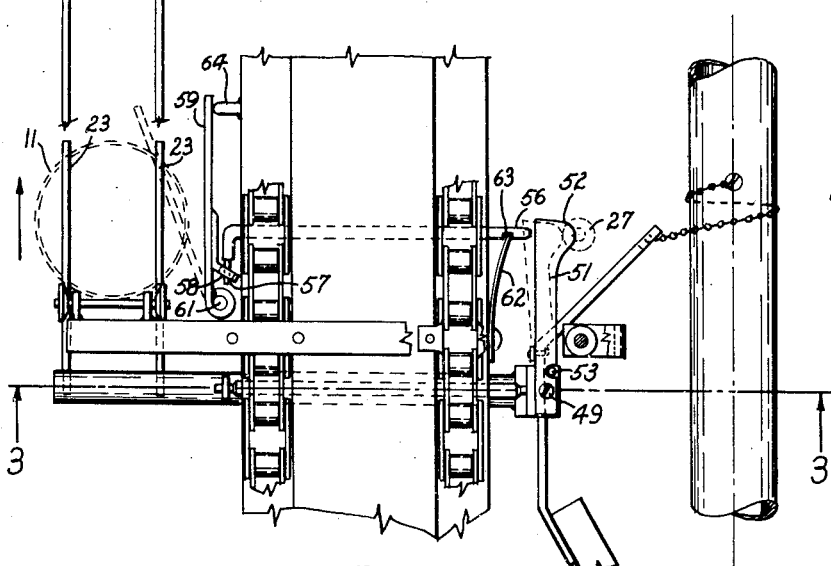
Fig. 2 is a top plan view of Fig. 1.
Figure 3:
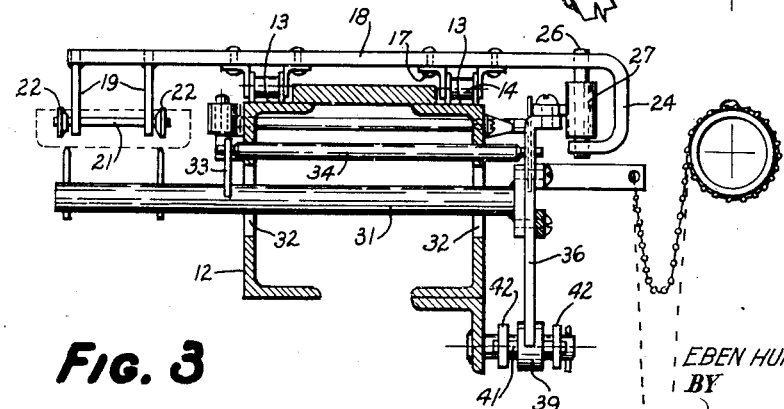
Figure 4:
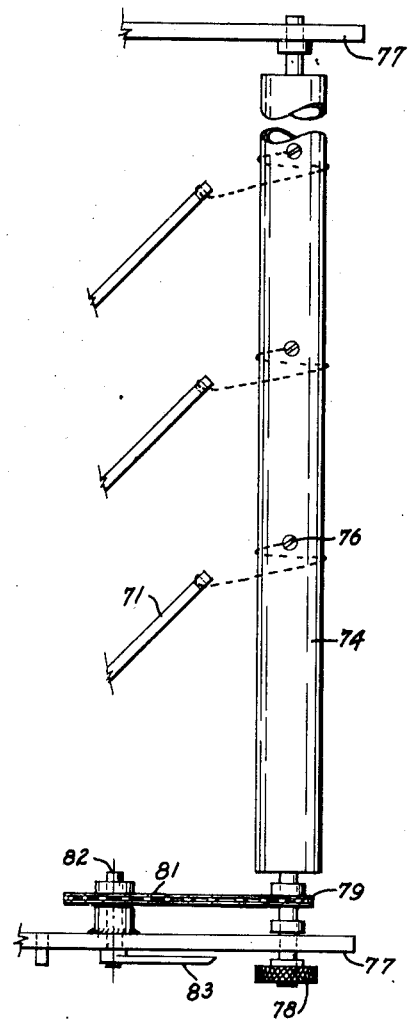
Figure 5:
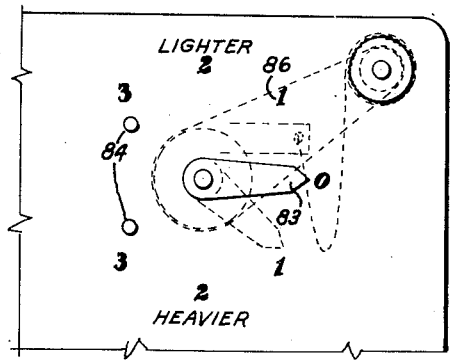

Fig. 3 is a cross-sectional elevation view taken substantially on the line 3—3 of Fig. 2;

Fig. 4 is a fragmental plan view showing means for adjusting all the weighing mechanisms simultaneously; and Fig. 5 is an end elevation of Fig. 4.

In the machines of the above copending applications, it is essential for their correct operation that the articles being conveyed be weighed accurately and sorted in accordance with their weight into separate groups or compartments. The articles or pieces of tuna are placed or carried in trays or supports 11, each of the trays being of exactly the same weight and each being preferably circular in section.

For the purpose of moving or conveying the trays a frame, generally indicated by the numeral 12, is provided having longitudinally extending tracks or ways 13 upon which two chains 14 may ride and be supported. The chains are endless and are driven by sprockets, not shown, which may be driven in any suitable manner, as shown in the above mentioned copending applications.

The chain pivot pins 16 (Figs. 1 and 3) carry at suitable spaced intervals, bracket-like connecting links 17 to the upper horizontally extending surfaces of which may be riveted or otherwise secured a cross bar 18. It will be understood that a series of cross bars are provided at spaced intervals along the chain, only one of which is shown. The cross bars are carried and driven by the chains and each has at one end a pair of depending arms 19 which support at their lower ends a shaft 21 upon the ends of which rollers 22 are mounted.

The rollers are adapted to engage the circular side walls of the trays and push the trays along a path of travel formed by a series of spaced parallel arms 23. The arms 23 are spaced longitudinally along the path of travel so that the trays pass from one pair of arms to another in a continuous manner until they reach a weighing device which they are capable of actuating. The other end of the cross bar is bent as shown at 24, to provide a support for a shaft 26 which carries a roller 27.

The parallel arms 23 constitute the weighing or lever arms of a weighing mechanism which is actuated (assuming the proper weight) as the trays are moved along the path of travel formed by the weighing arms 23. Since each of the weighing device assemblies is the same only one of them need be described. The ends of the weighing arms 23 are carried by a cross rod 31 which is free to oscillate in openings 32 formed in the frame 12. At one end of the rod 31 a connecting member 33 is provided which has an opening for the pivotal reception of the end of a rod 34. The rod 34 extends through the frame and pivotally supports at its other end a lever arm, generally indicated by the numeral 36, which is fixed to the rod 31 as shown in the drawings.

It will now be appreciated that as the trays move along with a piece of pieces of tuna thereon, the weighing arms 23 may be depressed so that the rod 31 may swing about the pivots formed on the ends of the rod 34, as resisted by the countertorque produced by the weighing mechanism now to be described.

The lever arm 36 extends downward along the frame and has at its lower end preferably two enlarged notches 37 and 38. These notches are adapted to receive a roller 39 carried on a pin 41 supported by a pair of bars 42. The bars 42 are pivoted (Fig. 1) at 43 and carry at the other end thereof an adjustable counterweight 44.

A counterweight 46 is carried on an arm 47 which is adjustably mounted on the lever arm 36. Upon loosening screws 48 the counterweight 46 may be adjusted with reference to the pivot point 34 by shifting the slot 50 with reference to the screws so as to increase or decrease the torque resisting the weight applied on the weighing arms 23.

Mounted at the top of the lever arm 36 on a pivot pin 49 is a bar 51 which has a cam 52 formed at the end thereof. A pin 53 carried by the lever arm 36 limits the movement of the bar 51 in one direction, the bar being pivotally movable to and from the dotted line position and solid line position shown in Fig. 2. A leaf spring 54 returns the cam bar 51 from the dotted to the solid line position shown in Fig. 2.

The cam bar 51 is adapted when in proper position to strike the end of a rod 56 which extends across the frame. The rod 56 is free to shift transversely of the frame when engaged by the cam bar 51. The other end of the rod 56 has a part 57 which lies in an opening 58 formed in a bracket carried by a kick-off bar 59. The kick-off bar is pivoted at 61 and is adapted to engage the tray when actuated, as shown in the dotted line position of the parts in Fig. 2, to displace the tray sidewardly out of the path of travel of the trays. The trays are preferably displaced into an adjacent tray compartment, as described in the above mentioned copending applications. The kick-off bar 59 and the rod 56 are restored to normal position by a leaf spring 62 which engages the margin of a notch 63 formed in the rod 56. Movement of the rod 63 and the kick-off bar 59 is limited by a stop 64.

Figure 1:
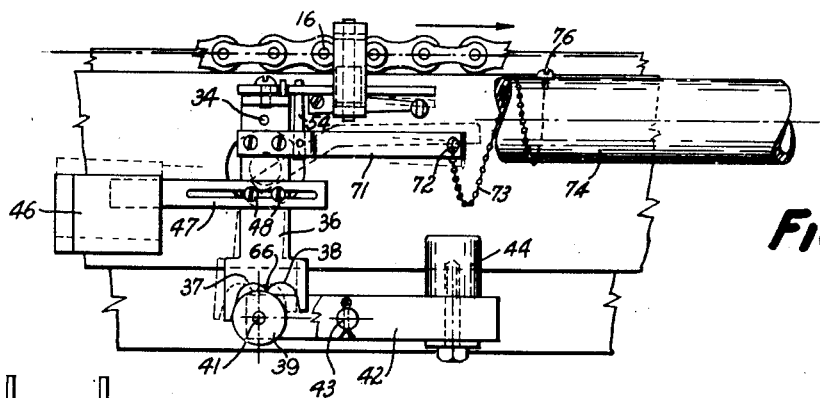
Fig. 1 is a side elevation of a portion of the machine of my invention and showing one of the series of weighing mechanisms.

The cam bar 51 normally lies in a position such that it is actuated by the roller 27 as the cross bar moves along the path of travel. However, the cam bar in its normally raised position, as shown in Fig. 1 in solid lines, is not in a position to engage the end of the rod 56. However, when an article of the sufficient weight is applied on the weighing arms 23 so as to depress the arms the cam bar 51 moves to the dotted line position shown in Fig. 1 in which position it is adapted to engage the rod 56 when the cam bar is actuated by the roller 27.

As described in the above mentioned applications, a series of weighing devices is provided along the path of travel of the trays each weighing device being set for a successively decreasing weight of article and tray. Since the trays are all of the same weight, the weighing mechanisms are effective to weigh the articles. The maximum torque is applied on the weighing arms 23 when a line through the center of gravity of the tray and article on the tray passes over the tips of the weighing arms. The trays pass along their path of travel and when they reach a scale or weighing device which they are capable of actuating, they are kicked-off or discharged sidewardly out of their path of travel into the adjacent compartments.

By means of the adjustable counterweight 46 each weighing device may be set independently of the others so that the series of weighing devices may be adjusted so as to discharge the trays in decrements of weight (tray and contents). That is, the first weighing device may discharge all trays containing pieces of tuna weighing in excess of 90 grams, the next weighing device may discharge all pieces weighing in excess of 87 grams, and the next weighing device all pieces in excess of 84 grams and so forth. The number of weighing devices employed will, of course, vary in accordance with the range of size of the pieces and the degree of difference in weight which it is desired to separate.

In its normal position the roller 39 lies in the notch 37. In this position the center of the roller is offset to the left with respect to a vertical line through the pivot point 34. Since a piece of the proper weight, in order to depress the weighing arms 33, must cause the roller to ride out of the notch 37 the equivalent of a toggle action is provided. This toggle action in and of itself applies a torque working against the load. This toggle action results from the fact that a point 66 between the notches is a fixed distance from the pivot point and the roller must ride out of the notch over the point or knife edge 66. However, as soon as the proper weight is applied the roller rides over the knife edge 66 between the notches 37 and 38. On the other side of the knife edge, the center of the roller is free to shift closer to the pivot center 34 so that a snap action of the weighing device is accomplished.

It will be noted that the knife edge 66 shifts to one side or the other of a vertical line to the center of the pivot 34. The toggle action applies a torque against the load when the roller lies in the notch 37 and as the roller shifts into the notch 38 a toggle action is applied with the load. Because of the toggle effect, the action is extremely quick. The action is sufficiently rapid so that the kick-off bar 59 is actuated before the tray being weighed passes beyond the reach of the kick-off bar.

The toggle action above described can be used alone to control the weighing but I have found that such an arrangement is sensitive to jars, especially to vertical vibrations. The weighing device may be improperly actuated by, for example a person walking heavily adjacent the machine. That is, a vertical jar may suddenly increase the torque of the load on the weighing arms 23 without producing a corresponding increase in the resisting torque of the toggle. This would naturally result in incorrect weighing. For this reason it is desirable to provide the adjustable counterweight 46. If the load is 100% counterweighted, a vertical jar theoretically would have no effect on the operation of the weighing device. However, this arrangement would not accomplish the trigger-like, non-hunting action that is desired. By using the combination of a counterweight and a toggle action, I am able to obtain the snap action desired and also cut down the effect of vibrations.

Preferably the apportionment of the countertorque is such that the counterweight does most of the weighing. The toggle action is preferably only strong enough to give the desired snap action and to retain the roller 39 in the notch 38 until after the kick-off bar has been actuated and preferably until after the tray has been at least partially removed from the weighing arms 23.

In the operation of the machine of the above mentioned applications, I have found that in weighing pieces and then selecting, for example, three pieces to make a combined weight of tuna of seven ounces that, at times, the pieces selected will be such that their combined weight will be consistently slightly over or slightly under the desired weight. This condition may exist even though each scale is weighing accurately. The reason for this is that pieces in each sorted group vary slightly in weight and it is possible to select a piece from each of three different groups each of which is over or each of which is under the average weight in its group. The combined weight of these three pieces will be somewhat over the desired weight of the combination, namely, seven ounces. It is necessary to guarantee at least a minimum weight of tuna in each can and therefore most of the cans will be slightly overweight. However, when the three pieces selected are consistently overweight to a considerable extent, this condition cannot be corrected except by extremely tedious adjustment of each of the adjustable counterweights 46.

I have further found it desirable to provide means for adjusting all of the weighing devices simultaneously in order to raise or lower the average to produce a heavier or lighter fill of fish. This may be desirable if the fish being canned are very dry. In such case the fish will absorb more of the canning oil and will make a higher drained weight of fish after processing. To offset this a slightly lighter average weight of pieces and hence lighter can fill is desirable.

For the purpose of making fine adjustments and to correct for consistent overweight (or underweight) of pieces selected, I have provided novel means which comprises an arm 71 which has one end fixed to the lever arm 30. The other end of the arm 71 has attached thereto, as indicated at 72, one end of a chain 73. The chain has its intermediate portions wrapped around a rod 74 and its other end attached, as shown at 76, to the rod. Each of the weighing devices is provided with a rod 71 and a chain 73, as shown in Fig. 4, the rod 74 being suitably journaled in frame members 77.

One end of the rod extends through the frame member and is provided with a thumb piece 78. A sprocket 79 fixed with respect to the rod 74 drives a sprocket 81 mounted on a shaft 82 which extends through the frame member 77 as shown. The end of the shaft 82 is provided with a pointer 83. The frame member is provided with suitable stops 84 for limiting the movement of the pointer and hence the rotation of the rod 74 and suitable graduations 86 so as to guide the operator.

When the thumb piece 78 is moved in one direction, the weight of an additional link or links is applied on the weighing devices and when moved in the opposite direction the weight of an additional link or links is taken off the weighing devices. Since as shown in Fig. 1 the arm 71 extends to the right of the pivot point 34 rotation of the thumb piece 78 clockwise lifts the weight of a link or links off the end of the bars and thereby slightly increases the weight of the pieces required to actuate the weighing devices.

Thus, if the three or more pieces selected by the machine of the above described applications are consistently overweight so that their combined weight is consistently overweight, this may be corrected by adjusting all the weighing devices so as to increase the chain load so that each of the weighing arms 23 will be actuated by a slightly lesser weight. By this arrangement a minimum weight for each can of tuna may be guaranteed and yet an extremely fine adjustment is possible to prevent the cans from averaging far over the weight guaranteed. Moreover, the machine may be quickly adjusted to meet varying fish conditions so as to increase or decrease the average weight of fish per can.

While I have shown and described the preferred form of my invention, it will be appreciated that various changes and modifications may be made therein, particularly in the form and relation of parts, without departing from the spirit of my invention as set forth in the appended claims.

I claim:

1. A machine of the character described, comprising, in combination, a weighing arm adapted to receive the article to be weighed, an article counterbalancing arm, a fulcrum between said arms, said counterbalancing arm having a pair of recessed portions and a high point between them, an element normally urged into one of said recessed portions, said element riding out of said recessed portion over the high point and into the other recessed portion when an article of the proper weight is applied on said weighing arm.

2. A machine of the character described, comprising, in combination, a weighing arm adapted to receive the article to be weighed, an article counterbalancing arm, a fulcrum between said arms, said counterbalancing arm having a pair of recessed portions and a high point between them, an element normally urged into one of said recessed portions, said element riding out of said recessed portion over the high point and into the other recessed portion when an article of the proper weight is applied on said weighing arm, and means for counterbalancing most of the weight of the article so that the weight required to cause said element to shift from one recessed portion to another is small.

3. A machine of the character described comprising, in combination, a series of weighing devices in weighing relation with which the articles are moved, means for moving the articles in weighing relation to the weighing devices, said weighing devices being set so as to each be actuated by a different weight, means for adjusting all of said weighing devices simultaneously, said means including a manually movable element and a flexible member which has a fixed weight per unit of length connected to each of said weighing devices from said movable element, and means for adjusting each of said weighing devices individually.

4. A machine of the character described comprising, in combination, a weighing arm adapted to receive the article to be weighed, an article counterbalancing arm, a fulcrum between said arms, a counterweight of said counterbalancing arm adapted to counterbalance a major portion of the weight of the article, means for counterbalancing the remainder of the weight of the article comprising a pair of notched openings having a high point between them, a roller, means for exerting a pressure on said roller such that said pressure opposes the depressing of the weighing arm by the article and when an article of the correct weight is applied on the weighing arm, said roller moves over the high point and is snapped into the other notch by the pressure applied thereto.

5. A machine of the character described comprising, in combination, a weighing arm adapted to receive the article to be weighed, an article counterbalancing arm, a fulcrum between said arms, a counterweight on said counterbalancing arm adapted to counterbalance a major portion of the weight of the article, means for counterbalancing the remainder of the weight of the article comprising a knife edge on said counterbalancing arm and in alignment with said fulcrum, pressure means for normally retaining said knife edge on one side of a line extending through the fulcrum, said pressure means snapping said counterbalancing arm so that said knife edge lies on the other side of said line when an article of the correct weight is applied on said weighing arm.

6. A machine of the character described comprising, in combination, a weighing arm adapted to receive the article to be weighed, an article counterbalancing arm, a fulcrum between said arms, a counterweight on said counterbalancing arm adapted to counterbalance a major portion of the weight of the article, means for counterbalancing the remainder of the weight of the article comprising a knife edge on said counterbalancing arm and in alignment with said fulcrum, pressure means for normally retaining said knife edge on one side of a line extending through the fulcrum, said pressure means snapping said counterbalancing arm so that said knife edge lies on the other side of said line when an article of the correct weight is applied on said weighing arm.

7. A machine of the character described comprising, in combination, a weighing arm adapted to receive the article to be weighed, an article counterbalancing arm, a fulcrum between said arms, a counterweight on said counterbalancing arm adapted to counterbalance a major portion of the weight of the article, means for counterbalancing the remainder of the weight of the article comprising a knife edge on said counterbalancing arm and in alignment with said fulcrum, pressure means for normally retaining said knife edge on one side of a line extending through the fulcrum, said pressure means snapping said counterbalancing arm so that said knife edge lies on the other side of said line when an article of the correct weight is applied on said weighing arm, and means actuated when said knife edge lies on said other side of the line for discharging the article from said weighing arm.

8. A machine of the character described comprising, in combination, a series of weighing members, means for continuously moving articles in weighing relation to said weighing members so that the articles pass from one member to the other, counterbalancing means for each of said weighing members including a snap action mechanism against the torque of which the weight of the article is applied, a device for engaging the article to discharge it from further movement in weighing relation to the series of weighing members, a movable striker for actuating said device carried by said counterbalancing means, and means including coacting parts on the means for moving the articles and on the striker for engaging the striker with said device when the snap-action mechanism is actuated.

9. A machine of the character described comprising, in combination, a series of weighing members, means for continuously moving articles in weighing relation to said weighing members so that the articles pass from one member to the other, counterbalancing means for each of said weighing members against the torque of which the weight of the article is applied, a device for engaging the article to discharge it from further movement in weighing relation to the series of weighing members, a movable striker for actuating said device carried by said counterbalancing means, and means including coacting parts on the means for moving the articles and on the striker for engaging the striker with said device when the counterbalancing means is actuated.

10. A machine of the character described comprising, in combination, a series of weighing members, means for continuously moving articles in weighing relation to said weighing members so that the articles pass from one weighing member to the other, counterbalancing means for each of said weighing members including a snap action mechanism against the torque of which the weight of the article is applied, a device associated with each of said weighing members for engaging the article and interrupting the article from further movement in weighing relation to succeeding weighing members of the series when the counterbalancing means is overcome by the weight of an article, means including an element carried by the counterbalancing means for engaging and actuating said device, and a manually movable device having connections to all of said counterbalancing means for adjusting the amount of counterbalance of all of said counterbalancing means uniformly and simultaneously.

11. A machine of the character described comprising, in combination, a series of weighing arms independent of each other, each of said weighing arms having counterbalancing means and being counterbalanced in substantially uniform decrements in the direction of movement of the articles, means for moving the articles along the weighing arms so that the weight of each article is individually applied to each successive weighing arm in turn until it reaches an arm the counterbalancing means of which it overbalances, and means including loosely hanging elements which have a fixed weight per unit of length interconnecting said counterbalancing means for adjusting the amount of counterbalance of all of said counterbalancing means both uniformly and simultaneously.

EBEN H. CARRUTHERS.

REFERENCES CITED

The following references are of record in the file of this patent:

UNITED STATES PATENTS

| Number | Name | Date |
|---|---|---|
| 308,322 | Moyers | Nov. 18, 1884 |
| 474,777 | Keith | May 10, 1892 |
| 1,867,008 | Heusser | July 12, 1932 |
| 1,935,075 | Brubaker | Nov. 14, 1933 |
| 1,954,164 | Wyland | Apr. 10, 1934 |
| 2,065,888 | Du Brul | Dec. 10, 1936 |
| 2,098,260 | Smith | Nov. 9, 1937 |
| 2,112,324 | Arbron | Mar. 29, 1938 |
| 2,279,947 | Keen | Apr. 12, 1942 |
| 2,198,285 | Krenzer | Apr. 23, 1946 |
| 2,204,134 | Howard | June 11, 1946 |